(No Model.)

H. R. ALLEN.
CAR WHEEL.

No. 383,846. Patented June 5, 1888.

Witnesses:
Paul Jorgason
Henry Kline

Inventor,
Horace R. Allen,
By Joseph A. Minturn
Attorney.

UNITED STATES PATENT OFFICE.

HORACE R. ALLEN, OF INDIANAPOLIS, INDIANA.

CAR-WHEEL.

SPECIFICATION forming part of Letters Patent No. 383,846, dated June 5, 1888.

Application filed August 9, 1887. Serial No. 246,550. (No model.)

*To all whom it may concern:*

Be it known that I, HORACE R. ALLEN, a citizen of the United States, residing at Indianapolis, in the county of Marion and State of Indiana, have invented certain new and useful Improvements in Car-Wheels; and I do hereby declare the following to be a full, clear, and exact description of the invention, such as will enable others skilled in the art to which it appertains to make and use the same.

The object of my invention is to provide an axle for railroad-cars with wheels so attached thereto as to prevent, as near as possible, all friction when running around the curves of a railroad-track.

It is well known that much friction is produced and much power expended in running around these curves with the common form of wheels and axles. It also often causes much danger by wrecks, broken rails, cars jumping off the track, broken flanges, wheels, &c.

I accomplish the object of my invention by the mechanism shown in the accompanying drawings, in which—

Figure 1:
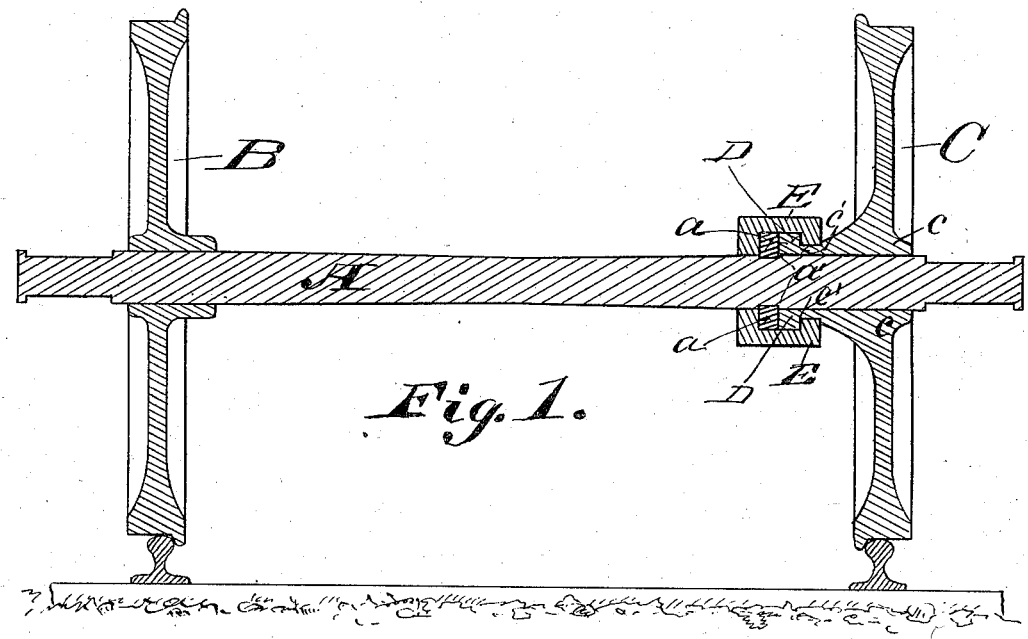
Figure 2:
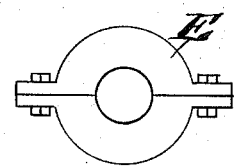
Figure 3:
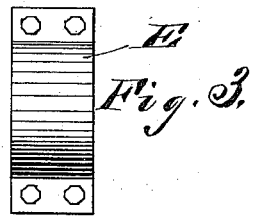

Figure 1 is a vertical sectional view showing the two wheels and an axle detached from the other parts of the car, and also showing a coupling by which the loose wheel is held in place on the axle. Fig. 2 is a side view of the coupling, and Fig. 3 a top view of same.

Similar letters refer to similar parts throughout the several views.

A is an iron axle, to which the wheel B, of common form, is permanently secured by pressing it firmly upon the axle, so that the wheel B will revolve with the axle.

C is a loose wheel, and is free to revolve on the axle A. In order to give the wheel a better bearing and a steadier motion the hub c is elongated at c'.

To hold the wheel C in its proper place on the axle, I use a split coupling or collar, E, which fits over a collar, a, on the shaft, and a flange, D, on the elongated hub c', as shown in Fig. 1. The flange D is cast integral with the hub c', and the collar a is shrunk upon the axle A, and to obviate all possibility of any slipping on the part of the collar a groove, a', may be made encircling the shaft and the collar shrunk into the groove. A split coupling or collar, as shown in Fig. 2, is necessary in order to apply it, as described, over the flange on the wheel and the collar on the axle. The axles are attached to the trucks by the box-bearings of common form.

In practical operation, as the wheel B is fastened permanently to the axle A, the axle will revolve uniformly with the wheel B, and the wheels B and C being of equal diameter the two wheels and the axle will turn together as long as the car is moving over a straight track; but in passing a curve where the outside rail is the longest the outside wheel must travel faster than the wheel on the inside. This is provided for by the loose wheel, which allows the outside wheel to travel faster than the other. It is not necessary for both wheels to be loose, for if the tight wheel B is on the outside the axle will turn in the wheel C, and if the loose wheel C is on the outside the wheel C will revolve upon the axle.

It is a decided advantage to have one wheel fast to the axle and one wheel loose, because the wheel that is fast to the axle will cause the axle to revolve, and thus avoid any friction between the axle and the loose wheel when traveling over a straight track.

Having thus fully described my invention, what I claim as new, and wish to secure by Letters Patent, is—

The axle having the annular groove to receive the annular collar, in combination with the wheel having its hub provided with the annular flange and groove, and a clip embracing the said collar and flange and fitting in the groove of the hub to secure the wheel on the axle and permit the same to revolve thereon, for the purpose set forth.

In testimony whereof I affix my signature in presence of two witnesses.

HORACE R. ALLEN.

Witnesses:
JOSEPH A. MINTURN,
LEONA A. MINTURN.